United States Patent
Ando et al.

(10) Patent No.: US 7,901,201 B2
(45) Date of Patent: Mar. 8, 2011

(54) PRESS-MOLDING MACHINE AND PRESS-MOLDING METHOD

(75) Inventors: Masaaki Ando, Toyota (JP); Yoshihiro Mizuno, Toyota (JP)

(73) Assignee: Kojima Press Industry Co., Ltd., Toyota-Shi, Aichi-Ken (JP)

( * ) Notice: Subject to any disclaimer, the term of this patent is extended or adjusted under 35 U.S.C. 154(b) by 1009 days.

(21) Appl. No.: 11/188,335

(22) Filed: Jul. 25, 2005

(65) Prior Publication Data

US 2007/0018357 A1    Jan. 25, 2007

(51) Int. Cl.
    *B29C 35/02* (2006.01)
(52) U.S. Cl. ......... 425/422; 425/441; 425/145; 425/538; 425/215; 425/436 R; 425/438; 425/436 RM; 264/142; 264/175; 210/255
(58) Field of Classification Search ............... 425/145, 425/538, 215, 436 R, 438, 436 RM, 422; 210/255; 264/142, 175
See application file for complete search history.

(56) References Cited

U.S. PATENT DOCUMENTS

| | | | | |
|---|---|---|---|---|
| 2,821,747 | A * | 2/1958 | Rossiter | 425/153 |
| 3,116,194 | A * | 12/1963 | Gottlieb | 156/500 |
| 3,738,788 | A * | 6/1973 | Langecker | 425/538 |
| 3,868,046 | A * | 2/1975 | Maddalena | 222/146.5 |
| 4,043,782 | A * | 8/1977 | Bamford et al. | 65/104 |
| 4,078,454 | A * | 3/1978 | Murakami et al. | 100/145 |
| 4,150,930 | A * | 4/1979 | Asano | 425/145 |
| 4,409,173 | A * | 10/1983 | Padovani | 264/210.2 |
| 4,416,607 | A * | 11/1983 | Winstead | 425/325 |
| 4,427,476 | A * | 1/1984 | Beck et al. | 156/199 |
| 4,436,685 | A | 3/1984 | Emura | |
| 4,958,716 | A * | 9/1990 | Matsuo et al. | 198/346.1 |
| 5,008,063 | A * | 4/1991 | Margiaria et al. | 264/297.2 |
| 5,085,815 | A * | 2/1992 | Yeh et al. | 264/142 |
| 5,088,592 | A | 2/1992 | Palmers | |
| 5,167,894 | A * | 12/1992 | Baumgarten | 264/175 |
| 5,221,406 | A | 6/1993 | Laurent et al. | |
| 5,358,397 | A * | 10/1994 | Ligon et al. | 425/145 |
| 2002/0020932 | A1 | 2/2002 | Kapfer et al. | |
| 2002/0079044 | A1 | 6/2002 | Feil et al. | |
| 2003/0017226 | A1* | 1/2003 | Ihara et al. | 425/215 |

FOREIGN PATENT DOCUMENTS

DE    1154690    9/1963

(Continued)

OTHER PUBLICATIONS

European Search Report for International Application No. EP05090221.2-2307 dated Jan. 12, 2006 (2 p.).

(Continued)

*Primary Examiner* — Joseph S Del Sole
*Assistant Examiner* — David N Brown, II
(74) *Attorney, Agent, or Firm* — Conley Rose, P.C.

(57) ABSTRACT

A press-molding machine is taught that may include an extrusion apparatus (10), a transfer apparatus (30), and a molding apparatus (40). The extrusion apparatus (10) may extrude a melted resin into a sheet shape. The transfer apparatus (30) may receive and transfer a sheet material that is extruded from the extrusion apparatus and cut in a predetermined length. The molding apparatus (40) may press and mold the sheet material transferred from the transfer apparatus. The extrusion apparatus (10), the transfer apparatus (30), and the molding apparatus (40), are allowed to be independently arranged and constructed.

6 Claims, 5 Drawing Sheets

FOREIGN PATENT DOCUMENTS

| | | |
|---|---|---|
| DE | 1958057 | 5/1971 |
| DE | 2325812 | 12/1972 |
| DE | 29807426 | 8/1998 |
| DE | 19961743 | 7/2001 |
| DE | 10163520 | 7/2003 |
| EP | 1279486 | 1/2003 |
| GB | 1436132 | 5/1976 |
| GB | 2055668 | 3/1981 |
| JP | 58-192030 | 6/1982 |
| JP | 58-094419 | 6/1983 |
| JP | 64-040311 | 6/1983 |
| JP | 7-276394 | 10/1995 |
| JP | 9-286033 | 11/1997 |
| JP | 8-300379 | 4/2007 |
| JP | 59-081123 | 4/2007 |
| WO | 9501248 | 1/1995 |

OTHER PUBLICATIONS

European Search Report for International Application No. EP05090221.2-2307 dated Jun. 6, 2006.
Japanese Office Action dated Mar. 13, 2007 for Patent Application No. 2004-028312.
English Translation of Japanese Office Action dated Mar. 13, 2007 for Patent Application No. 2004-028312.
Japanese Office Action dated Mar. 13, 2007 for Patent Application No. 2004-028311.
English Translation of Japanese Office Action dated Mar. 13, 2007 for Patent Application No. 2004-028311.
English Abstract of JP Publication No. 58-192030, Dec. 20, 1983.
English Abstract of JP Publication No. 09-286033, Nov. 4, 1997.
English Abstract of JP Publication No. 07-276394, Oct. 24, 1995.
English Abstract of JP Publication No. 08-300379, Nov. 19, 1996.
English Abstract of JP Publication No. 59-081123, May 10, 1984.
English Abstract of JP Publication No. 58-094419, Jun. 4, 1983.
English Abstract of JP Publication No. 64-040311, Feb. 10, 1989.
Japanese Laid-Open Utility Model Publication No. 6-144669, May 1994.
Japanese Laid-Open Utility Model Publication No. 63-91224, Apr. 1988.

* cited by examiner

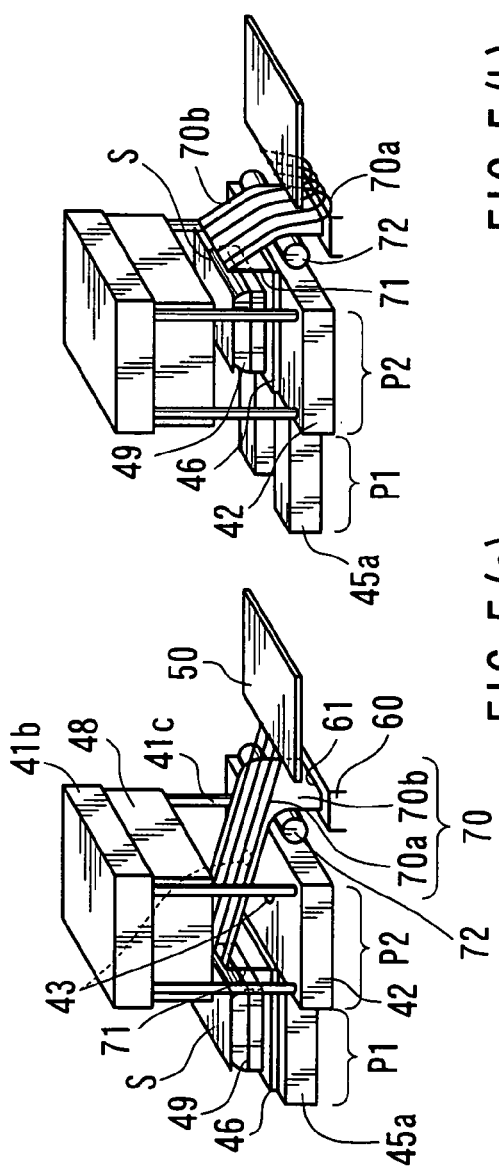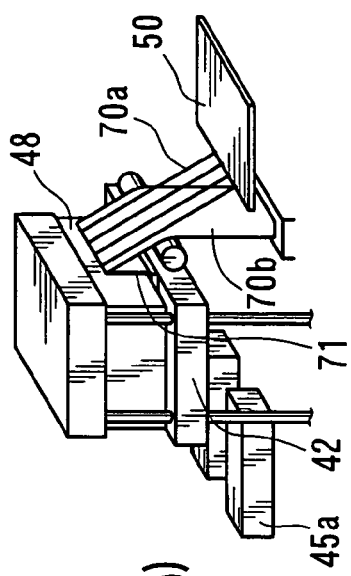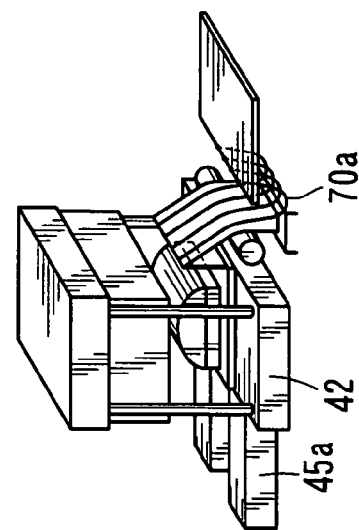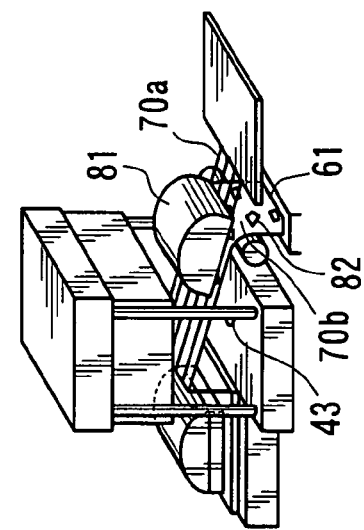
FIG. 5 (a)
FIG. 5 (b)
FIG. 5 (c)
FIG. 5 (d)
FIG. 5 (e)

PRESS-MOLDING MACHINE AND PRESS-MOLDING METHOD

This application claims priorities to Japanese patent application serial numbers 2004-028311 and 2004-018312, the contents of which are incorporated herein by reference.

BACKGROUND OF THE INVENTION

1. Technical Field

The present invention relates to a press-molding machine that extrudes a melted resin into a sheet material to press so that the sheet material is pressed and molded into a predetermined shape. In particular, the present invention relates to press-molding performed between a lower die and the corresponding upper die.

2. Description of the Related Art

Press-molding machines are known in manufacturing automotive interior or exterior parts. For example, Japanese Laid-Open Patent Publication No. 6-144669 teaches a press-molding machine wherein a resin sheet, continuously extruded from an extrusion device, is received by a transfer device including a first conveyor belt, a second conveyor belt, and a framework. Furthermore, a cutting device for cutting the continuous resin sheet is disposed between the first and the second conveyor belts. The resin sheet is received on the first conveyor belt and then transferred to the second conveyor belt. The resin sheet, cut in a predetermined length by the cutting device, is transferred from the second conveyor belt onto the framework. With the framework moving, the resin sheet is further transferred to be molded between a lower die and the corresponding upper die.

However, the above-mentioned molding machine is constructed to have the extruding device, the cutting device, the transfer device, the lower die and the upper die, in a single component. Due to this, the entire machine needs to be supported by a large frame.

In addition, a press-molding machine disclosed in Japanese Laid-Open Patent Publication No. 63-91224 is constructed so as to have a conveyor belt enter between opened dies. This requires that the clearance between the dies needs to be long enough to allow such interpositioning.

Such a larger machine needs more space for installation, which results in more workload for handling or installing the machine. Also, the maintenance or upgrading cost may be increased because the entire component should be replaced. Furthermore, the workload for post-processing the molded product or for recycling the scrap generated during the molding is not taken into consideration in the above-mentioned prior art machines.

SUMMARY OF THE INVENTION

Therefore, it is one object of the present invention to teach improved press-molding machines that save installation space and workload for handling the machine, and for post-processing the products.

According to one aspect of the present teachings, a press-molding machine is taught which may include an extrusion apparatus, a transfer apparatus, and a molding apparatus. The extrusion apparatus may extrude a melted resin into a sheet shape. The transfer apparatus may receive and transfer a sheet material extruded from the extrusion apparatus. The molding apparatus may press-mold the sheet material transferred from the transfer apparatus. As a result, the extrusion apparatus, the transfer apparatus and the molding apparatus are allowed to be independently arranged and constructed. This enables each component to be designed within a smaller frame and more easily handled. Therefore, in maintenance or upgrading, not all of the components need to be replaced. The cost as well as the workload may be more reduced.

According to another aspect of the present teachings, the extrusion apparatus may be supported by a supporting column standing on a base on the floor so that the extrusion apparatus can be moved up or down and pivoted with respect to the supporting column. The base may be movable backward and forward along the floor. This enables the extrusion apparatus to be easily installed or maintained. Also, it is possible to use this extrusion apparatus in combination with other transfer apparatuses in various geometries.

According to another aspect of the present teachings, the press-molding machine may further include a cutter provided at the outlet of the extruding die. The cutter may cut the sheet material in an predetermined length corresponding to a single molded product. This enables the continuously extruded sheet material to be cut before press-molding. Therefore, the post-processing of the press-molding is simplified so that the machine may be configured into a compact architecture.

According to another aspect of the present teachings, the transfer apparatus may include a conveyor belt and may be reciprocated substantially horizontally between a first position, directly below the extrusion die of the extrusion apparatus, and a second position, directly above the lower die of the molding apparatus. On one hand, when receiving on the conveyor belt the sheet material fed out from the extrusion apparatus, the transfer apparatus moves toward the molding apparatus at a speed corresponding to the extruding speed of the sheet material. On the other hand, when loading from the conveyor belt onto the lower die the sheet material cut in an predetermined length corresponding to a single molded product, the transfer apparatus moves back toward the extrusion die at a predetermined speed with the conveyor belt rotatably driven in the loading direction. This enables the sheet material to be fed without being overlapped, folded or wrinkled onto the conveyor belt of the transfer apparatus.

According to another aspect of the present teachings, the transfer apparatus may be changeable in a forward moving speed after having received the sheet material fed out from the extrusion die onto the conveyor belt, and/or in a backward moving speed after having loaded the sheet material from the conveyor belt onto the lower die of the molding apparatus. If the forward moving speed is changed from low-speed to high-speed after the transfer apparatus has received the sheet material, the sheet material may be loaded onto the lower die with less of an interval. Also, if the backward moving speed is changed from low-speed to high-speed after the transfer apparatus has loaded the sheet material from the conveyor belt onto the lower die, the transfer apparatus may quickly be ready and waiting for another sheet material fed out from the extrusion die. Therefore, the operation cycle time may be effectively reduced.

It should be noted that changing the moving speed of the transfer apparatus allows for controlling the temperature of the sheet material. If moving at a high-speed, the transfer apparatus may transfer a sheet material not sufficiently cooled down to the molding apparatus. On the contrary, if moving at a low-speed, the transfer apparatus may transfer a sheet material sufficiently cooled down to the molding apparatus. This leads to quality control of the products.

According to another aspect of the present teachings, the molding apparatus may include a stopper. This may prevent the sheet material from passing, due to inertia, beyond a predetermined position when the sheet material is unloaded from the transfer apparatus.

According to another aspect of the present teachings, a press-molding machine is taught that may include a slider, slider rails, a lower die and an upper die. The slider rails may be slidably engaging the slider. A resin sheet material may be loaded onto the lower die that is mounted on the slider. The lower die may fit into the upper die for press-molding. The lower die on the slider may move reciprocably between a first position where the lower die can receive the resin sheet material and a second position where the lower die is positioned directly below the upper die for the closing movement between the upper die and the lower die. This prevents the transfer apparatus from being limited by the upper die when entering between the upper die and the lower die, because the above area of the lower die is free from the corresponding upper die when the lower die is loading the sheet material thereon. Therefore, the machine may be made compact.

According to another aspect of the present teachings, a method of press-molding is taught that may include the following steps: a) providing a sheet material in an predetermined length corresponding to a single molded product; b) feeding the sheet material onto a conveyor belt; c) loading the sheet material from the conveyor belt onto a lower die at a waiting position; d) sliding the lower die having the sheet material from the waiting position to a working position; e) upwardly moving the lower die having the sheet material toward the upper die at the working position; f) press-molding the sheet material between the lower die and the upper die; g) downwardly moving the lower die at the working position; h) sliding the lower die back to the working position; i) catching the molded product dropped from the upper die at the working position; j) catching the after-molding scrap dropped from the upper die; and k) transferring the scrap to a scrap shredder. This allows for easier post-processing of the molded product and the generated scrap because the operation cycle may perform both the press-molding and the post-processing of the product and the scrap. Therefore, the method may effectively reduce the workload of the operators.

Additional objects, features, and advantages of the present invention will be readily understood after reading the following detailed description together with the claims and the accompanying drawings.

BRIEF DESCRIPTION OF THE DRAWINGS

FIG. 5(a) is a schematic view of the press-molding machine showing a first step of a press-molding process in which a sheet material is disposed on a lower die;

FIG. 5(b) is a schematic view of the press-molding machine showing a second step of the press-molding process in which the lower die having the sheet material is moved so as to be positioned under the upper die;

FIG. 5(c) is a schematic view of the press-molding machine showing a third step of the press-molding process in which the lower die having the sheet material has been moved up and fitted into the upper die;

FIG. 5(d) is a schematic view of the press-molding machine showing a fourth step of the press-molding process in which the lower die has been lowered onto the same level as FIG. 5(b) while the molded sheet material is retained in the upper die;

FIG. 5(e) is a schematic view of the press-molding machine showing a fifth step of the press-molding process in which the molded sheet material, i.e. product, and pieces of scrap have fallen down and are caught by the chute.

DETAILED DESCRIPTION OF THE INVENTION

Figure 1:
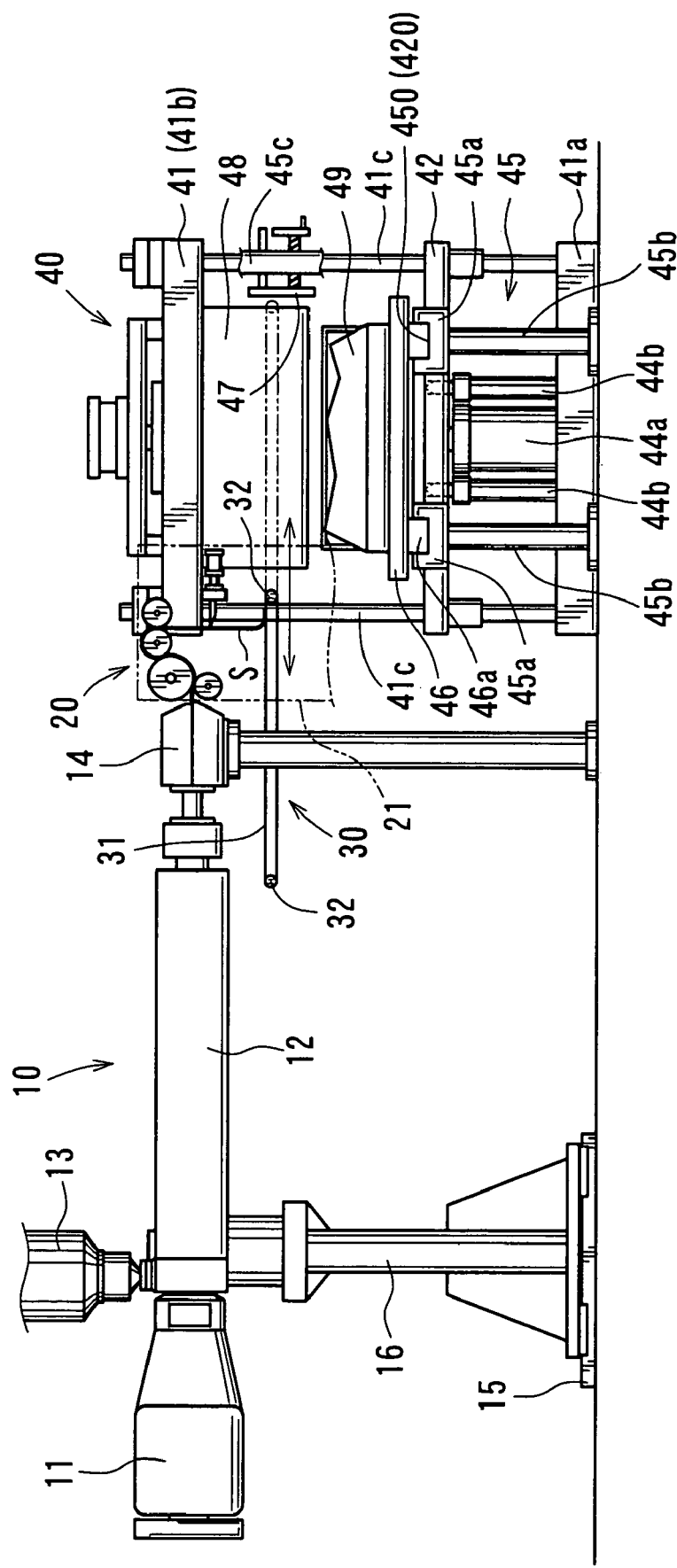
FIG. 1 is a front elevational view of a press-molding machine according to one representative embodiment of the present invention.

Each of the additional features and teachings disclosed above and below may be utilized separately or in conjunction with other features and teachings to provide improved press-molding machines and methods for designing and using such press-molding machines. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

As shown in FIGS. 1 to 4, a press-molding machine of the present invention generally comprises an extrusion apparatus 10, a roller mechanism 20, a transfer apparatus 30, and a molding apparatus 40, which can be independently arranged and constructed.

The extrusion apparatus 10 comprises an extruder 11 driven by a motor 11a (shown in FIG. 2), and a sheet molding portion 12. The sheet molding portion 12 is generally cylindrically shaped and connected with the motor 11a. Also, the sheet molding portion 12 is provided therein with particulate or granulated resins from a hopper 13 and may heat and melt the resins. Driven by the extruder 11, the melted resin is fed to an extrusion die 14 and molded into a sheet shape. The sheet-shaped resin fed from the sheet molding portion 12 is formed and extruded by the extrusion die 14 into a sheet material with a predetermined width and thickness.

The extrusion apparatus 10 is supported by a supporting column 16 standing on a base 15 on the floor. The base 15 can move along the floor to the left and the right in FIGS. 1 and 2. The extrusion apparatus 10 can move up and down along the suporting column 16. Also, the extrusion apparatus 10 can pivot about the supporting column 16. Therefore, it is possible to adjust the height or the horizontal position of the extrusion die 14 of the extrusion apparatus 10.

The roller mechanism 20 is disposed in proximity to the outlet of the extrusion die 14. The roller mechanism 20 includes a frame member 21 and four rollers 22 to 25 that are supported on a frame member 21. It should be understood that the frame member 21, depicted with chain lines, may be extended from the floor as a stand, or extended from the extrusion die 14. As clearly shown in FIG. 4, each roller 22 to 25 is rotated in the direction shown by arrow. A sheet material S is extruded from the extrusion die 14 and initially fed between the rollers 22 and 23. Then, the sheet material S is rolled up by the roller 23 and passed between the rollers 23 and 24. The sheet material S is further passed between the rollers 24 and 25 and fed downward to the transfer apparatus 30. When the sheet material S is passed through the rollers 22 to 25, the temperature of the sheet material S is controlled (cooled down) and the dimensions are adjusted such as width or thickness of the sheet material S.

Within the frame member 21 of the roller mechanism 20, a cutter 26 is disposed so as to be positioned directly below the rollers 24 and 25. Being activated by an air cylinder 28, a cutter 26 can move forward, or in the left direction, from a waiting position shown in FIG. 4. By moving the cutter 26 forward, the sheet material S fed downward through between the rollers 24 and 25 can be cut in a predetermined length corresponding to the product to be molded in the molding apparatus 40.

As shown in FIG. 1, the transfer apparatus 30 comprises a conveyor belt 31 bridged between a pair of conveyor rollers 32. The conveyor belt 31 can be reciprocated substantially horizontally between a first position, where it is positioned directly below the extrusion die 14 as depicted with solid lines in FIG. 1, and a second position, where it is positioned in front of the molding apparatus 40 as depicted with chain lines. It should be noted that the transfer apparatus 30 may be configured to rotate either of the conveyor rollers 32 as a well-known conveyor belt, or to rotate both of the conveyor rollers 32.

The molding apparatus 40 is an apparatus for press-molding the sheet material S into a predetermined shape. A receiving deck 45 is disposed in proximity to the molding apparatus 40. More specifically, the receiving deck 45 is positioned so as to be directly below the transfer apparatus 30 when the transfer apparatus 30 has moved from the solid line position to the chain line position in FIG. 1. The receiving deck 45 includes a pair of parallel slider rails 45a that are respectively supported by slider rail legs 45b extended from the floor. Both of the slider rails 45a may support a plate-like slider 46. The slider 46 can move along the slider rails 45a toward the molding apparatus 40.

The slider 46 is provided thereon with a lower die 49 of the molding apparatus 40. The lower die 49 may be configured to be a male die able to fit into a female die. In addition, the receiving deck 45 is provided thereabove with a stopper 47. As shown in FIG. 1, the stopper 47 is located opposed to the end of the transfer apparatus 30 when the transfer apparatus 30 has moved toward the chain line position.

Figure 2:
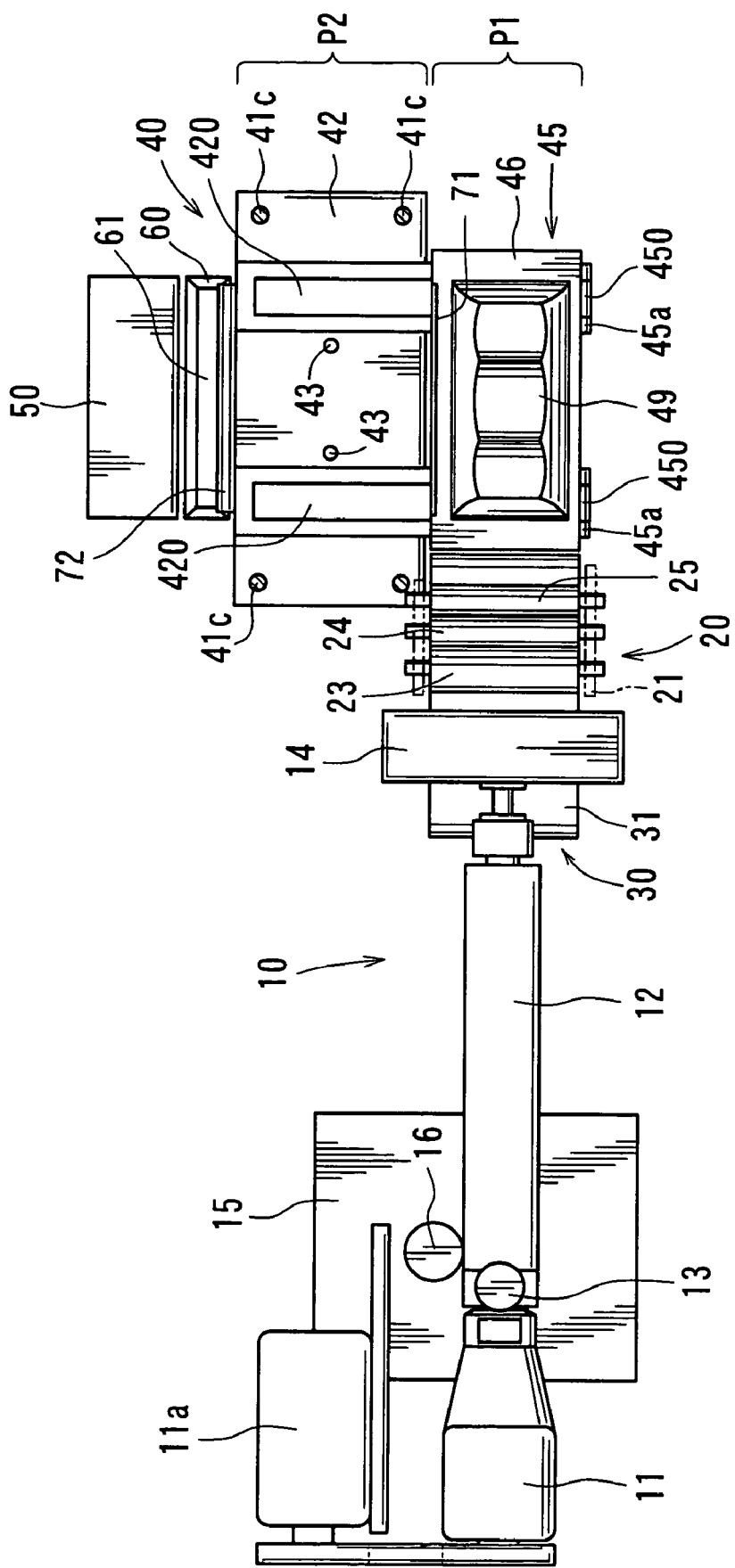
FIG. 2 is a plan view of the invention of FIG. 1, illustrating a condition in which an upper die, an upper frame of the molding apparatus, and a stopper for a transfer apparatus are removed.
Figure 3:
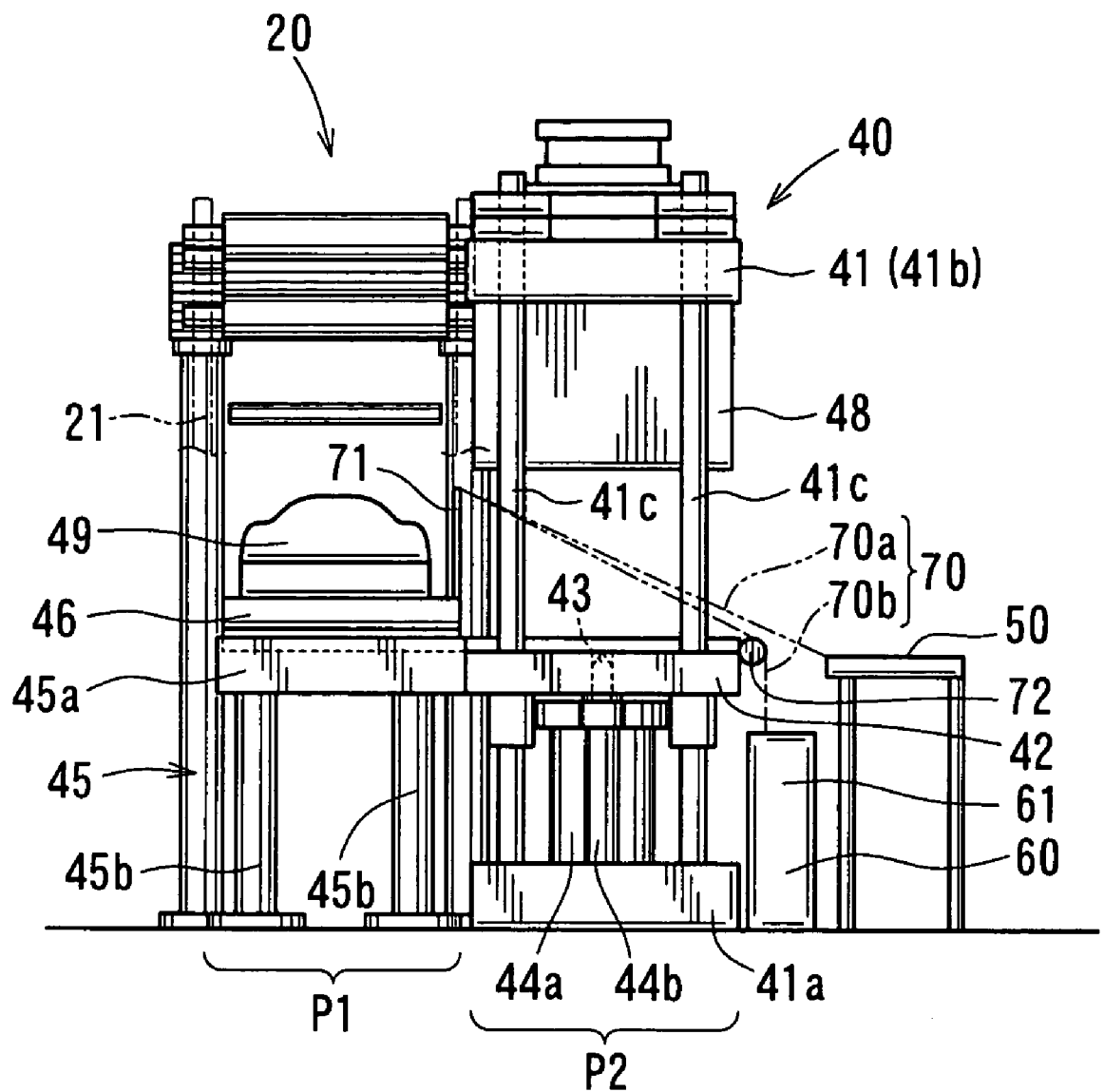
FIG. 3 is a right side elevational view of the invention of FIG. 1, illustrating a condition in which the stopper for the transfer apparatus is removed.
Figure 4:
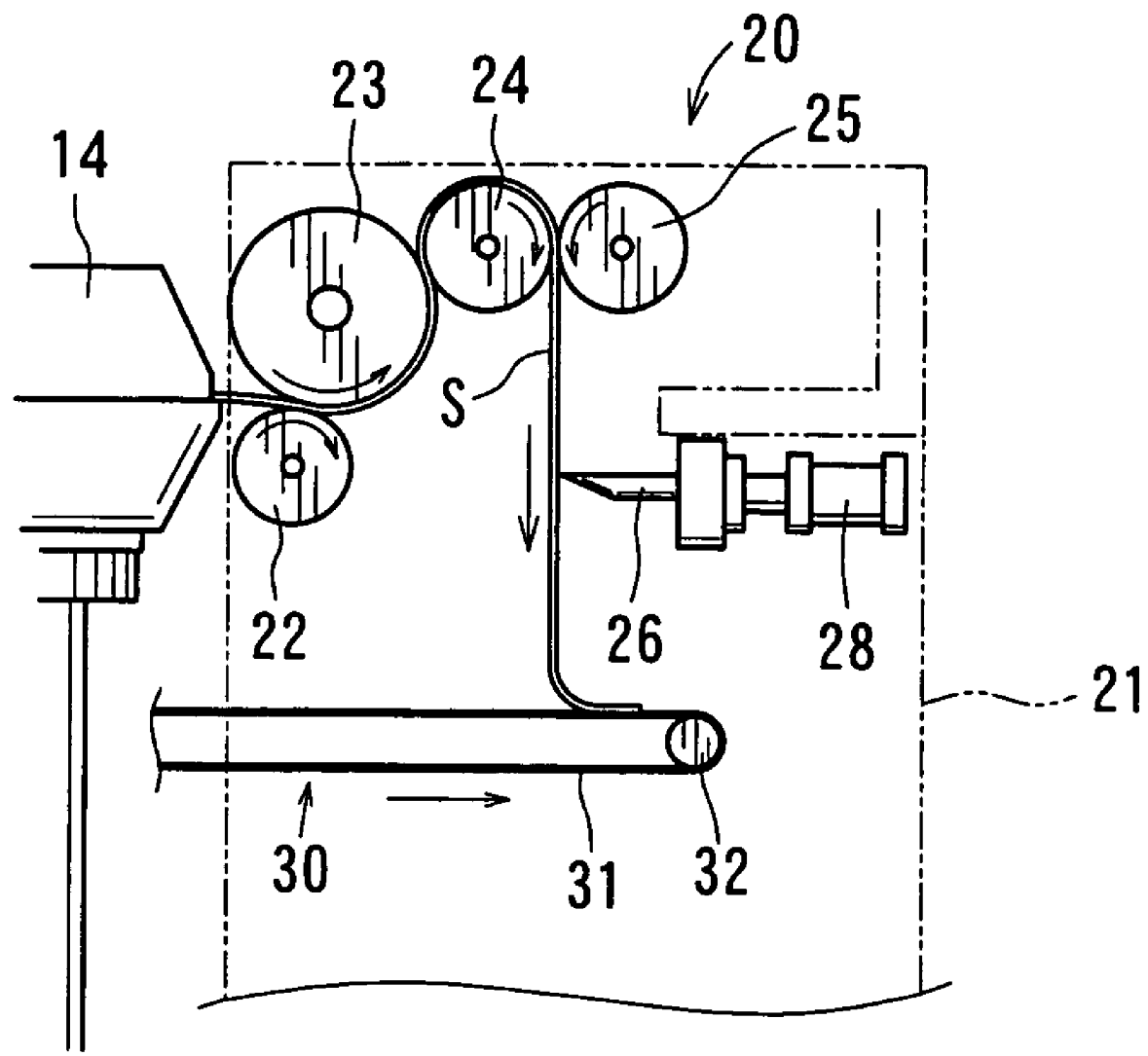
FIG. 4 is a partially enlarged view of FIG. 1.

The molding apparatus 40 includes frame unit 41. The frame unit 41 includes four guide rods 41c that may connect an upper frame 41b with a lower frame 41a disposed on the floor. The bottom of the upper frame 41b is provided with a bottom-opening upper die 48, i.e. a female die, of the molding apparatus 40. The molding apparatus 40 includes a lifting base 42 that is disposed below the upper die 48. The lifting base 42 is arranged and constructed to move up or down, guided by the guide rods 41c. Under the lifting base 42, an air cylinder 44a is provided so as to move the lifting base up or down. Thus, the activation control of the air cylinder 44a may enable the lifting base 42 to be moved up or down. As shown in FIGS. 2 and 3, a scrap shredder 60, including a scrap slot 61, and a product deck 50 are provided on the opposite side of the receiving deck 45 with respect to the molding apparatus 40.

The slider 46 of the receiving deck 45 can move with the lower die 49 toward a predetermined position on the lifting base 42 of the molding apparatus 40. As shown in FIGS. 2 and 3, the lifting base 42 may be provided with a pair of locator pins 43 for positioning the slider 46. The locator pins 43 can be projected above the top surface of the lifting base 42 or withdrawn below the top surface by air cylinders 44b shown in FIGS. 1 and 3. When the slider 46 is sliding on the lifting base 42, projecting the locator pins 43 above the top surface of the lifting base 42 may allow the locator pins 43 to be engaged into the bottom surface holes (not shown) of the slider 46 so that the slider 46 is positioned at a predetermined position on the lifting base 42.

Next, the molding apparatus 40 will be specifically described according to the sequential steps of the press-molding process after the transfer apparatus 30 has transferred the sheet material S onto the receiving deck 45. In the press-molding process, the sheet material S may be passed generally through the following four positions within the molding apparatus 40: a waiting position P1, a working position P2, a scrap shredder 60 position, and a product deck 50 position, from the left to the right in FIG. 3. The configuration of each position will be described below.

First, the waiting position P1 may be configured mainly regarding the lower die 49 used for press-molding. The lower die 49 is secured onto the substantially central portion of the slider 46. The top surface of the lower die 49 may fit to the bottom surface of the upper die 48. The slider 46 may be generally formed as a rectangular plate. The bottom surface of the slider 46 is provided with a pair of parallel rail engaging portions 46a extending substantially over the transverse direction. Each of the rail engaging portions 46a may have a generally rectangular cross section. The rail engaging portions 46a slidably engage the slider rails 45a. As best shown in FIG. 1, the top of each slider rail 45a may have a first slider engaging groove 450 forming a substantially U-shaped cross section. The two rail engaging portions 46a respectively engage the first slider engaging groove 450. The slider 46 may be actuated by a conventional driver such as an air cylinder, which is not shown for a purpose of clarity.

As shown in FIGS. 2 and 3, at the working position P2, the edge of the top surface of the slider 46 is provided with a chute supporting member 71, which may stand generally vertical on the top surface of the slider 46. The chute supporting member 71 may generally have a frame shape. The vertical legs of the member 71 are secured onto the top surface of the slider 46. On the other hand, the horizontal portion of the chute supporting member 71 is disposed substantially over the longitudinal length of the lower die 49. Also, the horizontal portion of the chute supporting member 71 is provided with a chute 70 having an upper chute 70a and an lower chute 70b, both of which are shown with chain lines in FIG. 3. The lower chute 70b, which may consist of a flexible polymer sheet, is stretched from the chute supporting member 71 via a lower chute guide 72 at the working position P2 to a scrap slot 61 or an upper opening of the scrap shredder 60. The upper chute 70a is disposed above the lower chute 70b. The upper chute 70a may include four wires of a flexible metal or polymer in predetermined spaced parallel relation to each other (see FIGS. 5(a) to 5(e)). The four wires are stretched to the product deck 50.

Second, the working position P2 is configured mainly regarding the upper die 48 used for press-molding. The overall profile of the upper die 48 may have a substantially rectangular shape with an opening bottom end. Although not shown, the inside profile of the upper die 48 is configured to fit the outside profile of the lower die 49 in order to perform a prescribed press-molding. When fitting to the upper die (female die) 48, the lower die (male die) 49 may enter into the upper die 48. In addition, the inside of the upper die 48 is provided with a conventional cutting means (not shown), which may cooperate with the lower die 49 to trim the scrap away from a molded product 81 and to cut the scrap into scrap pieces 82 (see FIG. 5(e)). The inside of the upper die 48 may further be provided with a releasing means (not shown) that may operably release and drop off the product 81 adhered to the inside surface of the upper die 48 immediately after press-molding. These cutting and releasing means may allow the molded product 81 and scrap pieces 82 to be more easily caught and recovered. As best shown in FIGS. 3 and 5(a), the top of the upper die 48 is secured to the upper frame member 41b having a substantially rectangular plate shape. Four guide rods 41c having a substantially cylindrical shape are respectively threaded and secured at the four corners of the upper frame member 41b or the rectangular plate. Thus, the upper frame member 41b is secured to the lower frame member 41a via the guide rods 41c. It should be understood that the structural elements depicted on the top of the upper frame 41b in FIGS. 1 and 3 may serve as conventional fixtures or fasteners for the upper die 48 and the guide rods 41c.

Shown in FIG. 3, the lifting base 42 in the working position P2 is disposed at substantially the same level as the slider rails 45a in the waiting position P1. The overall profile of the lifting base 42 may have a substantially rectangular plate shape, at the four corners of which the guide rods 41c are threaded through the lifting base 42. It should be noted that the lifting base 42 is configured to be moved up and down along the guide rods 41c by actuation of the air cylinder 44a as a driving source mounted on the lower frame member 41a. The lower lifting limit of the lifting base 42 may be substantially the same level as the slider rails 45a, while the upper lifting limit thereof may be high enough for the lower die 49 mounted on the lifting base 42 to fit into the upper die 48 to then perform press-molding. The lifting base 42 is also positioned sufficiently close to the slider rails 45a in order to smoothly receive the slider 46 moving from the slider rails 45a.

The structure of the lifting base 42 will be more specifically described below. As best shown in FIG. 2, the top surface of the lifting base 42 is provided with two parallel second slider engaging grooves 420, both of which may extend transversely on the top surface of the lifting base 42. Each of the second slider engaging grooves 420 may have a substantially U-shaped cross section provided on the lifting base 42. The second slider engaging grooves 420 in the working position P2 are configured to serve as continuous rail grooves from the first slider engaging grooves 450 in the waiting position P1. Thus, the slider 46, moving from the waiting position P1, may slide continuously to the working position P2.

It should be noted that the lifting base 42 is provided with a pair of holes spaced apart and pierced in substantially the middle of the transverse length of the lifting base 42 so that the pair of locator pins 43 can be engaged into the holes provided on the bottom of the slider 46 when the slider 46 has moved onto the lifting base 42, or the working position P2. As best shown in FIG. 3, the locator pins 43 are arranged and constructed to be projected through these holes from the bottom surface through the top surface of the lifting base 42. Then, the locator pins 43 may be engaged into the corresponding holes (not shown) of the bottom surface of the slider 46 so that the slider 46, or the lower die 49, is positioned at a predetermined position on the lifting base 42. It should also be noted that the locator pins 43 are configured to be moved up and down by the air cylinders 44b as a driving source mounted on the lower frame member 41a.

As shown in FIGS. 2 and 3, the side of the lifting base 42 in the vicinity of the scrap shredder 60 is provided with a lower chute guide 72 substantially over the longitudinal length of the scrap shredder 60. The lower chute guide 72 is configured to guide the sheet-shaped lower chute 70b into the scrap slot 61 from the chute supporting member 71 mounted on the slider 46. It should be noted that the lower chute guide 72 may be configured to allow the lower chute 70b to follow the horizontal reciprocatory movement of the slider 46 and the vertical lifting movement of the lifting base 42 or the slider 46. Therefore, although the shape of the lower chute guide 72 is cylindrical in shape, it is not limited to such specific shape as long as the above-mentioned configuration is assured.

Third, the scrap shredder 60 may be a conventional shredder for shredding resin pieces generated during the trimming process of press-molding. The scrap shredder 60 is configured to shred the resin scrap pieces 82, which may slip and slide downwardly along the sheet-shaped lower chute 70b into the scrap slot 61 as shown in FIG. 5(e), in order to recycle the scrap pieces 82 into a reworked material for another sheet material S. It should be noted that, although the shape of the scrap shredder 60 is depicted as a rectangular box in the figures for the purpose of clarity, it is not limited to such a specific shape. It should also be noted that, although the scrap shredder 60 is positioned close to the molding apparatus 40, the scrap shredder 60 may be positioned away from the molding apparatus 40. In this case, the scrap pieces 82 may be transferred from the lower chute 71b in the molding apparatus 40 to the scrap shredder 60 by a certain transfer means such as a conveyor belt.

Fourth, the product deck 50 may be in a conventional table shape. However, the product deck 50 may have a lock means to hold one end of the wire-shaped upper chute 70a stretched from the chute supporting member 71 on the slider 46. Therefore, the resin product 81, caught by the upper chute 70a, may slide downwardly along the upper chute 70a toward the product deck 50 to be loaded thereon. It should be noted that the product 81 loaded on the product deck 50 may be post-processed in situ or transferred away from the product deck 50 to another area for a post-processing by a certain transfer means such as a conveyor belt.

The operation of the press-molding machine of the present invention will be described below. First, the process wherein melted resin is extruded into a sheet material S and then cut by the cutter 26 will be described below.

As previously described, the sheet material S extruded from the extrusion die 14 of the extrusion apparatus 10 may be controlled in temperature and adjusted in dimension by passing through the rollers 22 to 25 within the roller mechanism 20. After passing between the rollers 24 and 25, the sheet material S may be fed onto the conveyor belt 31 of the transfer apparatus 30, waiting in the position depicted with solid lines in FIGS. 1 and 4. At this point, the transfer apparatus 30 may receive the sheet material S onto the conveyor belt 31, moving from the solid line position to the chain line position in FIG. 1 at a speed corresponding to the sheet material feeding speed, i.e. the speed at which the sheet material S is extruded from the extrusion die 14. The above-mentioned operation may enable the sheet material S to be appropriately fed onto the conveyor belt 31 without being overlapped, folded or wrinkled.

Then, the sheet material S may be cut by the cutter 26 in a predetermined length the corresponds to a single molded product 81 (see FIG. 5(e)) to be fed onto the conveyor belt 31. After receiving the sheet material S corresponding to a single molded product 81 onto the conveyor belt 31, the transfer apparatus 30 may move faster toward the chain line position in FIG. 1 by switching its moving speed to high-speed, and then stop at the chain line position. The chain line position of the transfer apparatus 30 in FIG. 1 is located directly above the receiving deck 45. On the receiving deck 45 is positioned the lower die 49 mounted on the slider 46. At this position, the sheet material S on the conveyor belt 31 may be loaded onto the lower die 49. During the feeding, the transfer apparatus 30 may move back toward the solid line position in FIG. 1 at a predetermined speed at which the conveyor rollers 32 may rotate and drive the conveyor belt 31 to unload the sheet material S. Therefore, the sheet material S may be unloaded properly onto the lower die 49. After having unloaded the sheet material S onto the lower die 49, the transfer apparatus 30 may move back faster toward the solid line position in FIG. 1 by switching its moving speed to high-speed. Then, the transfer apparatus 30 may be allowed to receive on the conveyor belt 31 another sheet material S extruded from the extrusion die 14 of the extrusion apparatus 10 for the next press-molding.

It should be noted that when the transfer apparatus 30 has stopped at the chain line position in FIG. 1, the sheet material S may be prevented from passing, due to inertia, beyond the predetermined position by a stopper 47, shown also in FIG. 1, blocking the sheet material S on the conveyor belt 31. Furthermore, when the transfer apparatus 30 unloads the sheet material S on the conveyor belt 31 onto the lower die 49, the sheet material S may be prevented from passing, due to inertia, beyond the predetermined position by a stopper 47 blocking the sheet material S. As shown in FIG. 1, this stopper 47 is supported on a portion of a vertical frame member 45*c* of the receiving deck 45 in such a manner that the position may be adjustable.

Next, the process wherein the sheet material S cut by the cutter 26 is transferred to the molding apparatus 40 for press-molding will be described below with reference to FIGS. 5(*a*) to 5(*e*). It should be noted that FIGS. 5(*a*) to 5(*e*) respectively show each step of the process schematically and do not include some specific elements shown in FIGS. 1 to 3 such as the first slider engaging groove 450 and the slider rail legs 45*b* for the purpose of clarity.

The steps shown in FIGS. 5(*a*) to 5(*e*) will be respectively described below in a time-series manner.

The first step of the press-molding process is shown in FIG. 5(*a*). The sheet material S may be fed by the transfer apparatus 30 and loaded onto the lower die 49, ready and waiting at the waiting position P1. At this point, at the working position P2, the lifting base 42 is waiting on substantially the same level as the slider rails 45*a*. It should be noted that the chute 70 may be stretched with a certain tension from the chute supporting member 71 standing on the edge of the slider 46 mounting the lower die 49 to the scrap shredder 60 and the product deck 50.

The second step of the press-molding process is shown in FIG. 5(*b*). The slider 46 mounting the lower die 49, on which the sheet material S has been loaded at the waiting position P1, may slide to the working position P2 along the slider rails 45*a*. The sliding may allow the slider 46 to reach a predetermined position where the lower die 49 of the slider 46 can fit properly into the upper die 48. At this position, the slider 46 may be positioned by the locator pins 43, which may be projected from the lifting base 42 so as to be engaged into the holes provided on the bottom surface of the slider 46 (not shown). During the sliding, the chute 70, stretched from the chute supporting member 71, may move closer to the scrap shredder 60 and the product deck 50. This may result in loosening the wire-shaped upper chute 70*a* due to gravity, while the sheet-shaped lower chute 70*b* may be adjusted to maintain the original level of tension by a tension control means (not shown) within the scrap shredder 60 cooperating with the lower chute guide 72. It should be understood that such tension control means may also be applicable to the upper chute 70*a* in order to maintain the original tension thereof. Such tension control means may prevent the chute 70 from jamming into a clearance, for example, between the slider 46 and the lifting base 42.

The third step of the press-molding process is shown in FIG. 5(*c*). At the working position P2, the lower die 49 on the slider 46, positioned to fit properly into the upper die 48, may be moved up toward the upper die 48 with the sheet material S on the lower die 49, according to the lifting of the lifting base 42 by the air cylinder 44*a* (shown in FIGS. 1 and 3). The lifting of the lifting base 42 may allow the lower die 49 to enter into the upper die 48 in order to perform the press-molding. During the press-molding, the sheet material S may be molded between the upper die 48 and the lower die 49 into a predetermined shape, while the periphery of the sheet material S may adhere to the inside surface of the upper die 48.

It should be noted that this adhering may happen naturally because of the pressing between the upper die 48 and the lower die 49. However, the adhering may be ensured by using a holding means such as vacuum suction in order to not release the molded product down inadvertently. On the other hand, the chute supporting member 71 on the edge of the slider 46 may also be moved up with the lifting base 42. The chute supporting member 71 may be placed opposite to the upper die 48. At this moment, the upper chute 70*a* may be stretched again without loosening because the chute supporting member 71 has been moved away enough from the product deck 50 to maintain the original tension.

The fourth step of the press-molding process is shown in FIG. 5(*d*). At the working position P2, the after-molding sheet material S adhered to the inside surface of the upper die 48, i.e. the product 81 and the scrap, may be maintained within the upper die 48. Then, the lower die 49 may be moved down with the lifting base 42, while the product 81 and the scrap remain within the upper die 48. The lifting base 42 may move down until the lifting base 42 has been positioned at the same height as the slide rails 45*a*, i.e. at substantially the same level as shown in FIG. 5(*b*). On the other hand, the upper chute 70*a* may be loosened again as well as shown in FIG. 5(*b*) since the chute supporting member 71 has also been lifted down.

The fifth step of the press-molding process is shown in FIG. 5(*e*). After the fourth step shown in FIG. 5(*d*), the slider 46 may slide back from the working position P2 to the waiting position P1 shown in FIG. 5(*e*), where the slider 46 may be ready and waiting for another cycle of the press-molding process. It should be noted that the upper chute 70*a* and the lower chute 70*b* may have been stretched with the same original tension as in FIG. 5(*a*). As a result of the upper chute 70*a* and the lower chute 70*b* being stretched by the tension, the product 81 trimmed away by the cutter mechanism of the upper die 48 (not shown) as well as the scrap pieces 82 may be dropped down by a certain dropping means (not shown) to be easily processed. Specifically, the product 81 may be large enough to be caught on the stretched wires of the upper chute 70*a*, along the slope of which the product 81 may slide down toward the product deck 50.

On the other hand, the scrap pieces 82 may be small enough to pass between the wires of the upper chute 70*a* so that the scrap pieces 82 may fall down on the sheet-shaped lower chute 70*b* to be led into the scrap slot 61 due to the slope of the lower chute 70*b*. It should be noted that, even if some of the scrap pieces 82 should stay inadvertently on the sheet of the lower chute 70*b*, the scrap pieces 82 may be expected to be shaken off in the course of repeating the cycle of the press-molding process from FIG. 5(*a*) to FIG. 5(*e*).

After the product 81 and the scrap pieces 82 have been processed in a predetermined manner, another sheet material S may be loaded onto the lower die 49 ready and waiting at the waiting position P1 shown in FIG. 5(*a*), and another cycle from FIG. 5(*a*) to FIG. 5(*e*) will be repeated.

The invention claimed is:

1. A press-molding machine, comprising:
an extrusion apparatus extruding a melted resin into a sheet shape;
a transfer apparatus receiving and transferring the sheet material extruded from the extrusion apparatus;
a molding apparatus press-molding the sheet material transferred from the transfer apparatus, the molding apparatus having a lower die onto which the sheet material is loaded, an upper die that is capable of engaging the lower die for press moldings, and a lifting base;
a receiving deck having a slider and slider rails slidably engaging the slider, and
a chute that is provided on the slider and includes an upper chute composed of multiple parallel wires and a lower chute formed in a sheet shape and positioned directly below the upper chute,
wherein the lower die is secured on the slider so as to move with the slider,
wherein the slider is arranged and constructed to slide along the slider rails, so as to laterally move only the lower die between a first position where the lower die can receive the resin sheet material and a second position where the lower die is positioned directly below the upper die,
wherein the lifting base is arranged and constructed to move up and down when the lower die is in the second position, thereby moving the lower die up and down so as to be engaged with or disengaged from the upper die,
wherein the extrusion apparatus, the transfer apparatus and the molding apparatus are independently arranged and constructed,
wherein the chute is arranged and constructed to catch a molded product and/or scrap pieces dropped from the upper die when the lower die is in the first position, and
wherein both of the upper chute and the lower chute are arranged and constructed to move according to the sliding movement of the lower die on the slider and the closing movement between the upper die and the lower die.

2. The press-molding machine as in claim 1, wherein the extrusion apparatus is supported by a supporting column standing on a base on the floor so that the extrusion apparatus can be moved up or down and pivoted with respect to the supporting column, while the base is configured to be movable backward and forward along the floor.

3. The press-molding machine as in claim 1, the extrusion apparatus further comprising:
a sheet molding portion molding the melted resin into the sheet material and feeding out the sheet material in one direction;
an extrusion die adjusting the sheet material into a predetermined geometry and continuously extruding the adjusted sheet material; and
a cutter provided at the outlet of the extruding die,
wherein the adjusted sheet material is cut so as to have a predetermined length corresponding to a single molded product before the sheet material is fed out onto the transfer apparatus.

4. The press-molding machine as in claim 3, wherein the transfer apparatus includes a conveyor belt and is arranged and constructed to be reciprocated substantially horizontally between a first position directly below the extrusion die of the extrusion apparatus and a second position directly above the lower die of the molding apparatus,
wherein when receiving on the conveyor belt the sheet material fed out from the extrusion die, the transfer apparatus moves toward the molding apparatus at a speed corresponding to the extruding speed of the sheet material, and
wherein when loading from the conveyor belt onto the lower die the sheet material cut in a predetermined length corresponding to the single molded product, the transfer apparatus moves back toward the extrusion die at a predetermined speed with the conveyor belt rotatably driven in the loading direction.

5. The press-molding machine as in claim 4, wherein the transfer apparatus is arranged and constructed to be changeable in a forward moving speed after having received the sheet material fed out from the extrusion die onto the conveyor belt, and/or in a backward moving speed after having loaded the sheet material from the conveyor belt onto the lower die of the molding apparatus.

6. The press-molding machine as in claim 1, wherein the molding apparatus comprises a stopper arranged and constructed to stop the sheet material from passing beyond a predetermined position when the sheet material is unloaded from the transfer apparatus.

\* \* \* \* \*